US007258292B2

(12) United States Patent
Cheung

(10) Patent No.: US 7,258,292 B2

(45) Date of Patent: Aug. 21, 2007

(54) MINI-TYPE FOOD CHOPPER

(76) Inventor: Yiu Joe Cheung, Flat B, 3/F, Merry Terrace, 4A-9 Seymour Road, Hong Kong (HK)

( * ) Notice: Subject to any disclaimer, the term of this patent is extended or adjusted under 35 U.S.C. 154(b) by 0 days.

(21) Appl. No.: 10/569,034

(22) PCT Filed: Dec. 8, 2004

(86) PCT No.: PCT/CN2004/001429

§ 371 (c)(1),
(2), (4) Date: Feb. 17, 2006

(87) PCT Pub. No.: WO2006/000134

PCT Pub. Date: Jan. 5, 2006

(65) Prior Publication Data

US 2006/0231655 A1 Oct. 19, 2006

(30) Foreign Application Priority Data

Jun. 23, 2004 (CN) .................. 2004 2 0073203 U

(51) Int. Cl.
*A47J 17/00* (2006.01)

(52) U.S. Cl. ...................................... 241/169; 241/272

(58) Field of Classification Search ................ 241/169, 241/272, 199.11
See application file for complete search history.

(56) References Cited

U.S. PATENT DOCUMENTS

| | | | | |
|---|---|---|---|---|
| 3,933,315 | A * | 1/1976 | Popeil | 241/166 |
| 4,134,205 | A * | 1/1979 | Heling | 30/287 |
| 6,467,711 | B2 * | 10/2002 | Michel | 241/169 |
| 7,100,854 | B2 * | 9/2006 | Aby-Eva et al. | 241/169 |
| 7,152,821 | B2 * | 12/2006 | Aby-Eva et al. | 241/169 |

* cited by examiner

*Primary Examiner*—Faye Francis
(74) *Attorney, Agent, or Firm*—J. C. Patents

(57) ABSTRACT

A small-sized food chopper for chopping up foodstuffs, includes an outer case including a lower casing removably connected with an upper casing and a button mounted on the upper casing; a blade connection holder installed inside the outer case, the blade connection holder can move axially up and down in the outer case; a plurality of blades installed on the lower end of the blade connection holder; a reset spring sheathed on the blade connection holder which restores the blade connection holder axially up; a mechanism which makes the blade connection holder rotate a predetermined angle circumferential each time the blade connection holder operates axially; the button is configured such that it can slide up and down axially, and the button acts on the upper end of the blade connection holder to make the blade connection holder move axially downwardly.

11 Claims, 8 Drawing Sheets

MINI-TYPE FOOD CHOPPER

BACKGROUND OF THE INVENTION

1. Field of the Invention

This invention relates to a small-sized food chopper, and more particularly, to a small food chopper for chopping up foodstuff.

2. Description of the Related Art

Food choppers mainly use a handle to connect itself with a reset spring and further control a W-shaped blade, the foodstuff is repetitively cut by repetitively pushing down the handle, and each time the handle is pushed down, the handle, together with the W-shaped blade will rotate a certain angle so that the foodstuff is chopped up by the blade. There are two designs in the prior art technology: one is an apparatus with a stainless steel outer case completely wrapping the interior parts, comprising a reset spring, a W-shaped blade and a through shaft with inside sprocket. However, this design has a defect, for the whole food chopping apparatus is hidden in the stainless steel outer case, and thus it is rather difficult to cleanse it each time after chopping up the foodstuff. In addition, this known technical design has other defects, besides its large volume, which occupies a relatively large space, although the material of this design is mainly stainless steel, many interior parts are made of metal, therefore, after a long period of use, it contaminates the foodstuff due to the rusting problem, which is a problem that cannot be neglected.

Besides, another designing method is an apparatus with a plastic outer case wrapping the interior parts; comprising a lower half handle, a W-shaped blade and a through shaft with inside sprocket, whereas the upper half handle and the reset spring are exposed. However, this design has a defect: the exposed reset spring is more prone to damage, which renders the food chopper not durable enough; although the food chopper uses a plastic outer case instead, many other parts are still made of metal, and thus the rusting problem of the food chopper still exists; in addition, the principles of the rotation of the aforesaid two food choppers are both that: the handle which is on the through shaft with inside sprocket is pushed down, and when it is raised and returns to the original state, the pit lines on the handle of this portion will be shifted from one sprocket tooth inside the through shaft to another sprocket tooth next to it so as to achieve the rotation effect; however, this design will result in the parts in charge of rotation and the parts in charge of the pushing-down action locating at the same place and thus affecting each other, wherein the biggest problem is that when the handle is pushed down and when it begins to rotate and rise, the handle will readily be stuck and thus cannot successfully accomplish the whole chopping process.

SUMMARY OF THE INVENTION

To solve the aforesaid problems, it is an object of the present invention to provide a small-sized food chopper, which has an exterior which is pleasing to the eye, its volume is smaller than any prior food chopper, its operation is more convenient and reliable, and it does not rust.

To achieve the aforesaid objects, the present invention provides a small-sized food chopper for chopping up foodstuffs, characterized in that it comprises: an outer case including a lower casing removably connected with an upper casing and a button mounted on the upper casing; a blade connection holder installed inside said outer case, said blade connection holder can move axially up and down in the outer case; a plurality of blades installed on the lower end of the blade connection holder; a reset spring sheathed on the blade connection holder which restores the blade connection holder axially up; a means which makes the blade connection holder rotates a predetermined angle circumferentially each time the blade connection holder operates axially; said button is configured such that it can slide up and down axially, and said button acts on the upper end of the blade connection holder to make the blade connection holder move axially downwardly.

Preferably, the small-sized food chopper further includes a blade inner cover installed inside the lower casing, and axially fixed with respect to the lower casing, and when the small-sized food chopper is in a non-operation state, the blade is located in the blade inner cover.

Preferably, the blade inner cover is in the shape of a cup, and a slot is formed at its bottom which is in the same shape as that of the blade section and which allows the blade to move axially, the blade inner cover can rotate circumferentially along with the blade connection holder.

Preferably, axially extending projection columns or grooves are formed on the inner wall surface of the blade inner cover, whereas corresponding grooves or projection columns form on the blade connection holder to engage with the projection columns or the grooves formed on the inner wall surface of the blade inner cover.

Preferably, the blade connection holder consists of a cylindrical barrel body and a disc-shaped stand base, the blade is fixed on the stand base, the grooves or projection columns are formed on the stand base, while projections are formed on the flange at the top of the blade inner cover, and they lean against the stand base of the blade connection holder and it counterchecks the axial movement of the blade connection holder.

Preferably, the small-sized chopper further comprises a sleeve removably installed in the upper casing, the barrel body of the blade connection holder is inserted in the sleeve, a plurality of barrel body ribs axially extending from disc-shaped stand base upward are disposed on the outer wall of the barrel body of the blade connection holder, while a plurality of in-cap ribs extending axially upwardly are disposed on the inner wall of the sleeve, when the small-sized food chopper is in the non-operation state, each of the plurality of barrel body ribs is engaged between a pair of adjacent sleeve in-cap ribs to contain the circumferential rotation of the blade connection holder, whereas when the small-sized food chopper is in the operation state, the plurality of barrel body ribs can get disengaged axially from the sleeve in-cap ribs, inclined planes in the same slanting direction are formed on the upper ends of the barrel body ribs and on the lower ends of the in-cap ribs for impelling the barrel body ribs to be inserted between the in-cap ribs.

Preferably, a crown-like support cap is installed on the upper end of the blade connection holder, a plurality of sprocket-shaped cap top sprockets are formed by left and right bevel edges on the top of the crown-like support cap, while the button is cylindrical in shape with its top enclosed, on whose top a plurality of sprocket-shaped cover bottom sprockets are formed by left and right bevel edges on the inner wall.

Preferably, a plurality pairs of axially extending projection column tracks are disposed at a predetermined space circumferentially on the inner wall of the upper casing, a guiding groove track is thus defined between each pair of projection column tracks; a plurality of arc-shaped projections extending radially outwardly are formed at the flange of the lower end of the button, and the arc-shaped projections are engaged in the guiding groove tracks defined by each pair of the projection column tracks.

Preferably, a plurality of notches is disposed at a predetermined space circumferentially on the upper casing, the sleeve consists of a barrel body and a flange disposed at the lower end of the barrel body; a plurality of cap legs circumferentially spaced and extending upwardly are disposed on the flange, a clip hook is formed at the top end of the cap legs, and the sleeve is removably fixed on the upper casing by clipping the clip hook of the sleeve into the notches on the upper casing.

Preferably, the upper casing comprises an upper portion having a bigger diameter and a lower portion having a smaller diameter, and thus a step is formed between them, a plurality of circumferentially spaced projections are disposed at the axial positions of the lower portion having a smaller diameter adjacent to the step; a plurality of circumferentially spaced grooves are formed on the flange at the top end of the lower casing, and projections are disposed adjacent to the grooves, and the two portions are removably fixed to each other by inserting the lower portion having a smaller diameter of the upper casing into the lower casing and engaging the projections of the lower portion having a smaller diameter with the grooves on the flange at the top end of the lower casing, and then by relatively rotating the upper casing and the lower casing and making the projections of the upper casing go over the projections of the lower casing.

Preferably, a plurality of cap legs axially extending downwardly are formed on the crown-like support cap, clip hooks are formed at the ends of the cap legs, and locating groove columns are formed on the crown-like support cap; while a plurality of corresponding grooves are formed on the inner wall at the top of the barrel body of the blade connection holder, and locating grooves are formed on the barrel body of the blade connection holder; the crown-like support cap is removably fixed on the blade connection holder by clipping the clip hooks of the cap legs on the crown-like support cap into the grooves on the inner wall at the top of the barrel body of the blade connection holder, while the crown-like support cap is circumferentially located with respect to the blade connection holder by inserting the locating groove columns on the crown-like support cap into the grooves on the barrel body of the blade connection holder.

Preferably, the small-sized chopper further comprises a food container disposed at its bottom.

Preferably, the blades are Z-shaped blades.

The present invention provides a food chopper which is made of plastic except the blades which are made of stainless metal. This food chopper not only has an exterior pleasant to the eye, and is smaller in volume than any existing chopper, but it has solved the cleansing problem of the existing food choppers, it enables the user to disassemble the whole food chopper after use so as to cleanse it thoroughly. In addition, except the blades, the other parts of the small-sized food chopper are all made of plastic, and thus it greatly reduces the occurrence of the food contamination problem caused by the rusting of some composite parts due to long period of use. Furthermore, the design of a hidden inner reset spring makes the reset spring more difficult to be damaged, and makes the food chopper more durable; the most important point is that the part in charge of rotation and the part in charge of the pushing-down action in this design are operated at different positions of the composite parts, and thus when the handle is pushed down and just begins to rise, the handle will never be stuck and thus can successfully accomplish the whole chopping-up process.

DETAILED DESCRIPTION OF THE INVENTION

Figure 1:
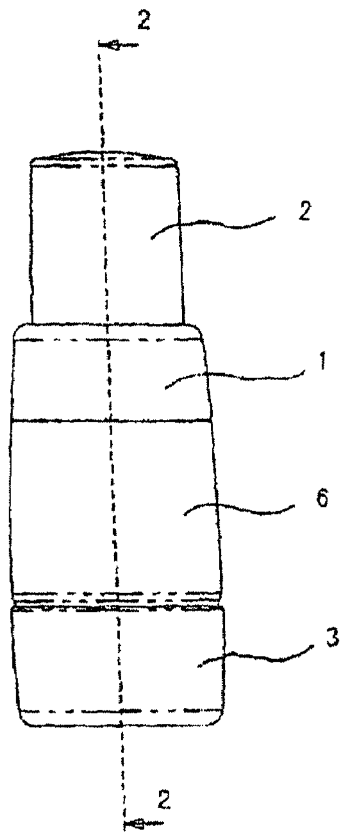
FIG. 1 depicts a front view of the food chopper in the present invention.
Figure 2:
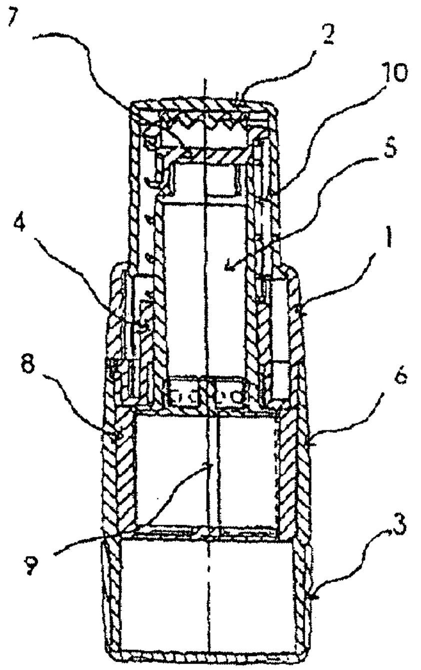
FIG. 2 depicts a section view along the line 2-2 shown in FIG. 1.

Firstly referring to FIG. 1 and FIG. 2, a small-sized food chopper in the assembled state in the present invention is shown. As shown in FIGS. 1 and 2, the small-sized food chopper in the present invention comprises: a transparent outer case 6; a blade inner cover 8 mounted inside the upper half of the transparent outer case 6; a blade connection holder 5 mounted in the blade inner cover 8 which can slide axially; two Z-shaped blades 9 mounted on the lower end of the blade connection holder 5; a sleeve 4 sheathed on the blade connection holder 5; a reset spring 10 sheathed on the blade connection holder 5; a crown-like support cap 7 mounted on the upper end of the blade connection holder 5; a plastic main body 1 whose lower end is connected with the transparent outer case 6, and is located on the upper end of the food chopper; and a top cover button 2 disposed on the topmost of the small-sized food chopper and is slidably connected to the plastic main body 1. Furthermore, FIGS. 1 and 2 also show a container 3 disposed at the bottom of the small-sized food chopper and for containing the foodstuffs to be processed.

Figure 3:
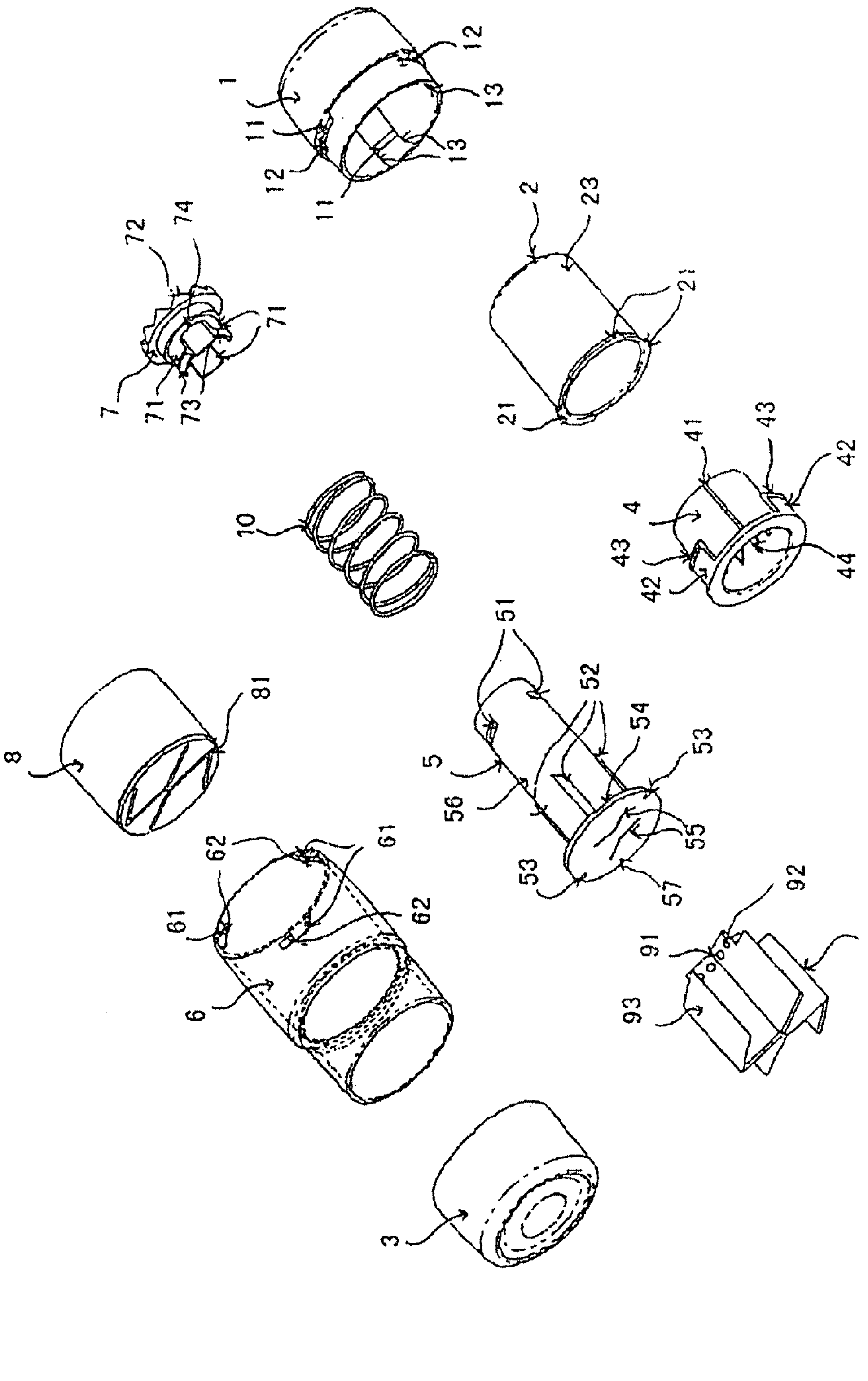
FIG. 3 depicts an exploded perspective view of the food chopper in the present invention.
Figure 10:
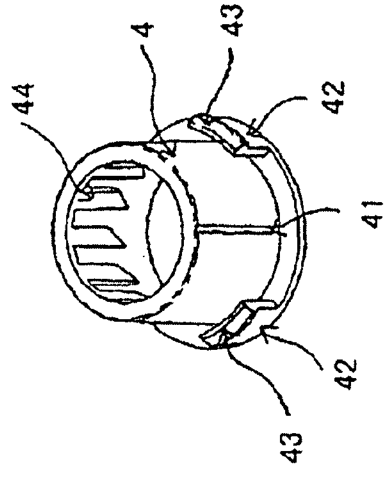
FIG. 10 depicts a perspective view of the sleeve shown in FIG. 3.
Figure 11:
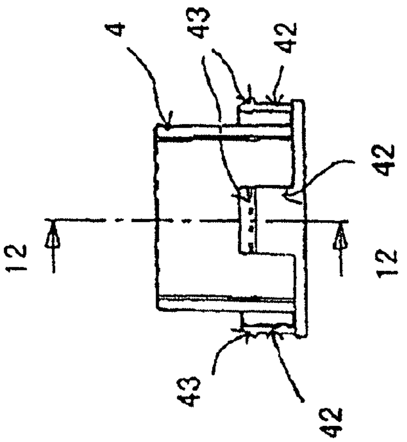
FIG. 11 depicts a front view of the sleeve shown in FIG. 10.
Figure 12:
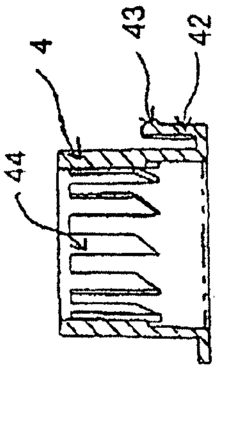
FIG. 12 depicts a section view along the line 12-12 shown in FIG. 11.

In addition, referring to FIG. 3, its perspective view shows the composite parts of the food chopper of the present invention and the configuration relationship of them. The container 3 is disposed at the bottom of the small-sized food chopper, and the transparent outer case 6 comprises an upper portion having a larger diameter and a lower portion having a smaller diameter, and thus a step is formed in between. The lower portion of the transparent outer case 6 is inserted into the container 3 and is sheathed by it. The blade connection holder 5 comprises a cylindrical barrel body 56 and a stand base 57, two V-shaped slots 55 are formed in the stand base 57, while a V-shaped connection brim 91 corresponding to the shape of the V-shaped slots 55 are disposed at the top of the blade 9, the V-shaped connection brim 91 is inserted right into the two V-shaped slots 55 in the stand base 57 of the blade connection holder 57, a plurality of connection through holes 92 are disposed in the V-shaped connection brim 91 as a bridge for firmly connecting the two. As shown in FIGS. 16-19, a plurality of barrel body ribs 52 extending axially downwardly are disposed on the base of the barrel body 56, the barrel body ribs 52 are functional components for realizing the rotation function of the small-sized food chopper (will be depicted in detail in combination with FIG. 25 in the following text). The sleeve 4 is sheathed on the blade connection holder 5 from the top down and is supported by the stand base 57 of the blade connection holder 5. As shown in FIGS. 10-12, the sleeve 4 consists of a barrel body and a flange at the lower end of the barrel body; three cap legs 42 spaced circumferentially and extending upwardly are disposed on the flange, a clip hook 43 is formed on the top end of each cap leg 42; further, recessed grains 41 extending axially are disposed between the adjacent cap legs; a plurality of in-cap ribs 44 are disposed on the upper portion of the inner wall of the barrel body of the sleeve 4, and the in-cap ribs 44 are functional components for realizing the rotation function of the small-sized food chopper (will be depicted in detail in combination with FIG. 25 in the following text). The reset spring 10 is sheathed on the barrel body 56 of the blade connection holder 5, and its lower end leans against the sleeve 4, while its top end leans against the crown-like support cap, as shown in FIG. 1.

Figure 13:
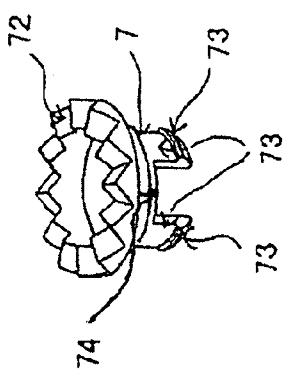
FIG. 13 depicts a perspective view of the crown-like support cap shown in FIG. 3.
Figure 14:
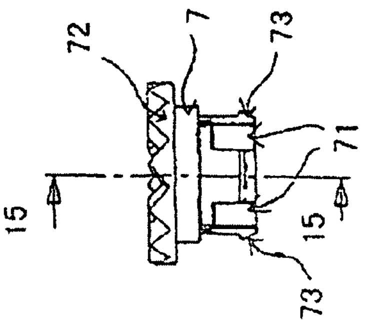
FIG. 14 depicts a front view of the crown-like support cap shown in FIG. 13.
Figure 15:
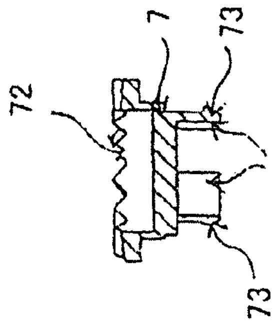
FIG. 15 depicts a section view along the line 15-15 shown in FIG. 14.
Figure 17:
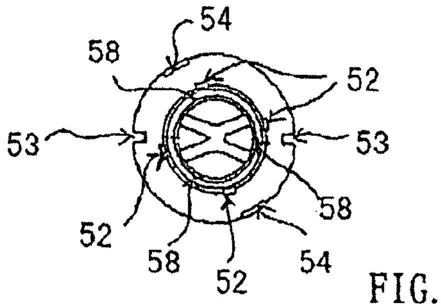
FIG. 17 depicts a top view of the blade connection holder shown in FIG. 16.
Figure 16:
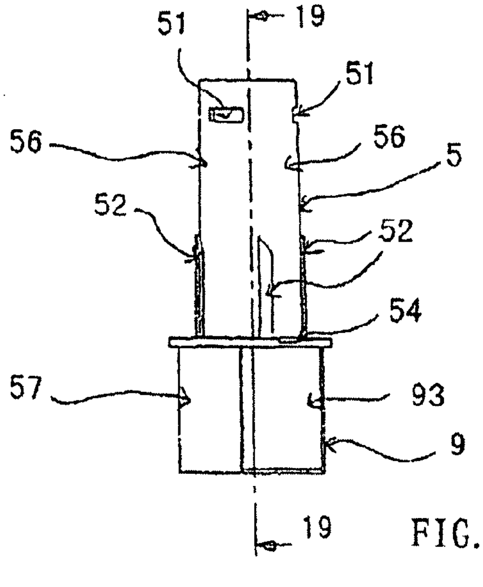
FIG. 16 depicts a front view of the blade connection holder shown in FIG. 3.

The crown-like support cap 7 is disposed on the blade connection holder 5. As shown in FIGS. 13-15, three cap legs 71 extending axially downwardly are formed on the crown-like support cap 7, a clip hook 73 is formed on the end of each cap leg 71; and three corresponding grooves 51 are formed on the inner wall at the top of the barrel body of the blade connection holder 5. Consequently, when the crown-like support cap 7 is mounted on the blade connection holder, the clip hooks 73 on the ends of the cap legs are blocked into the three grooves 51 in the inner wall at the top of the barrel body of the blade connection holder 5 so that the crown-like support cap 7 is fixedly located with respect to the blade connection holder 5. Further, a groove column 74 (as shown in FIG. 13) is formed on the crown-like support cap 7, while a groove 58 (as shown in FIG. 17) is formed on the barrel body 56 of the blade connection holder 5, when the blade connection holder S is mounted on the crown-like support cap 7, the groove column 74 on the crown-like support cap 7 is inserted into the groove 58 on the barrel body 56 of the blade connection holder 5 so that it positions the crown-like support cap 7 circumferentially.

Figure 21:
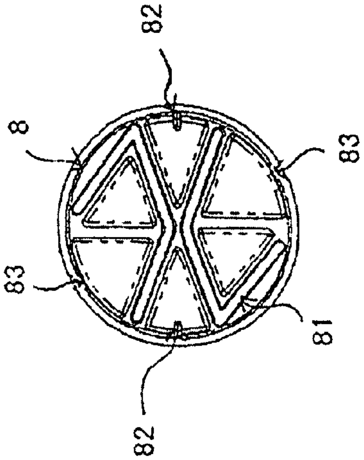
FIG. 21 depicts a top view of the blade inner cover shown in FIG. 20.
Figure 22:
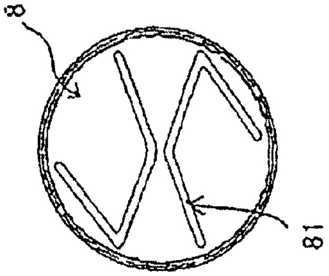
FIG. 22 depicts a bottom view of the blade inner cover shown in FIG. 20.
Figure 20:
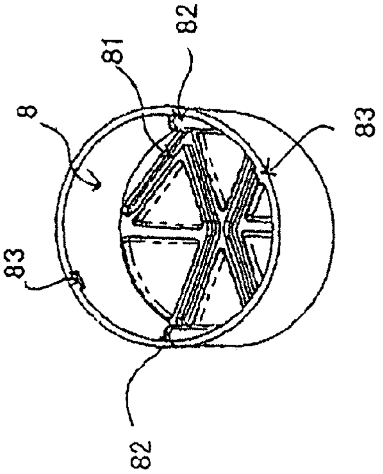
FIG. 20 depicts a perspective view of the blade inner cover shown in FIG. 3.

After the sub-assembly composed of the blade connection holder 5, the sleeve 4, the Z-shaped blades 9, the reset spring 10 and the crown-like support cap 7 are assembled, the sub-assembly is inserted into the blade inner cover 8, and the Z-shaped blade body 93 is located in the space within the blade inner cover 8. Two axially extending projection columns 82 (as shown in FIGS. 20-22) are formed opposite each other on the inner wall of the blade inner cover 8, and two small protrusions 83 (as shown in FIGS. 20-22) are formed opposite each other on the top end; two grooves 53 and two oppositely disposed notches 54 are formed on the stand base 57 of the blade connection holder 5. In the assembled state, the projection columns 82 are engaged with the grooves 53 so that the projection columns 82 serve as a track for guiding the blade connection holder 5, and allow the blade connection holder 5 to move up and down in the blade inner cover without rotation; furthermore, the two small protrusions 83 and the two small notches 54 collaboratively operate as a small obstacle so that some force is needed to insert the sub-assembly into the blade inner cover 8; after the assembling of the sub-assembly and the blade inner cover 8 is accomplished, the combination of the protrusions 83 and the notches 54 serves a stopping function, which makes it difficult for the blade inner cover 8 to come off after the assembling is accomplished, and the sleeve 4 disposed on the stand base 57 prevents the blade inner cover 8 from further moving upward.

Figure 4:
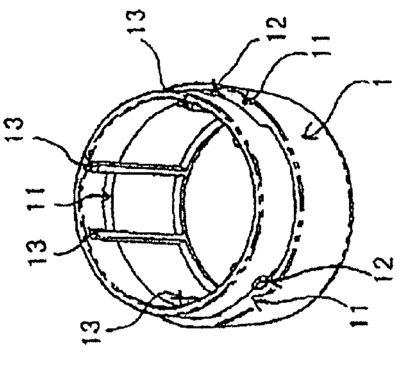
FIG. 4 depicts a perspective view of the plastic main body shown in FIG. 3.
Figure 5:
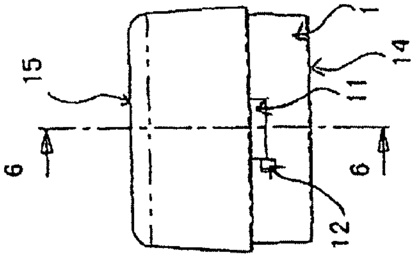
FIG. 5 depicts a front view of the plastic main body shown in FIG. 4.
Figure 6:
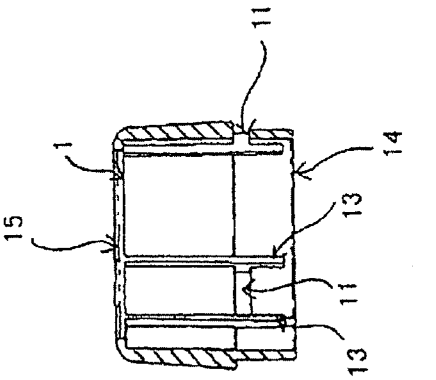
FIG. 6 depicts a section view along the line 6-6 shown in FIG. 5.

FIGS. 4-6 show the plastic main body 1. As shown in FIGS. 4-6, the plastic main body 1 comprises an upper portion having a larger diameter and a lower portion having a smaller diameter, and thus a step is formed in between; a flange extending radially inwardly is formed on the end of the upper portion having a larger diameter of the plastic main body 1, the flange defines a top hole 15 of the plastic main body 1; a notch 11 is formed on the top of the lower portion having a smaller diameter of the plastic main body 1. Three pairs of projection column tracks 13 are formed on the inner wall of the plastic main body 1, and each pair of projection column tracks define a groove track in between.

Figure 7:
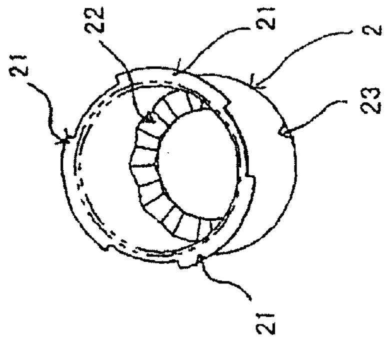
FIG. 7 depicts a perspective view of the top cover button shown in FIG. 3.
Figure 8:
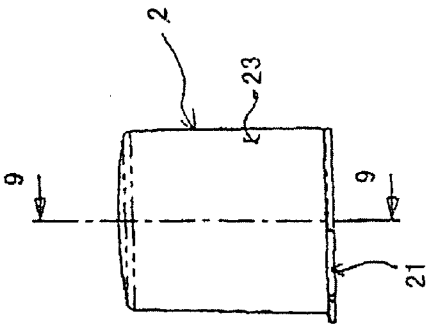
FIG. 8 depicts a front view of the top cover button shown in FIG. 7.
Figure 9:
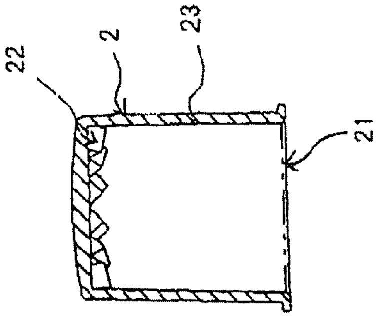
FIG. 9 depicts a section view along the line 9-9 shown in FIG. 8.

FIGS. 7-9 show the top cover button 2. As shown in FIGS. 7-9, the top cover button 2 is a sleeve-shaped member with the top end enclosed, and three arc-shaped projections 21 extending radially outwardly are formed on the flange of the lower end.

When being assembled, the top cover button 2 is inserted into the plastic main body 1 through a bottom hole 14 of the plastic main body 1 from the top down, and is drilled through from the top hole 15 of the plastic main body 1, the three arc-shaped protrusions 21 lean against the flange formed on the upper end of the plastic main body 1 so that the top cover button 2 will not come off from the top hole 15. Further, the three arc-shaped protrusions 21 of the top cover button 2 are respectively engaged in the groove tracks defined by the three pairs of the projection column tracks 13 on the inner wall of the plastic main body 1 so that the top cover button 2 will not rotate when it moves up and down in the plastic main body 1.

Then, the top cover button 2 and the plastic main body 1 which are connected with each other are sheathed on the sub-assembly composed of the blade connection holder 5, the sleeve 4, the Z-shaped blades 9, the reset spring 10 and the crown-like support cap 7, and the drooping clip hooks 43 on the three cap legs 42 of the sleeve 4 are to be inlaid into the notches 11 on the plastic main body 1 so that the two are connected with each other. Consequently, the blade inner cover 8, the blade connection holder 5, the Z-shaped blades 9, the sleeve 4, the reset spring 10, the crown-like support cap 7, the plastic main body 1 and the top cover button 2 are successfully connected; meanwhile, the cap top sprockets 72 (as shown in FIGS. 13-15) of the crown-like support cap 7 are right engaged with the cover bottom sprockets 22 (as shown in FIGS. 7-9) of the top cover button 2.

Finally, the aforesaid assembly is inserted into the transparent outer case 6 and thus the assembly of the small-sized food chopper is accomplished. When being assembled, since the outer diameter of the blade inner cover 8 and the inner diameter of the upper portion having a larger diameter of the transparent outer case 6 are the same, the blade inner cover 8 can be right inserted into the upper half of the transparent outer case 6 and be sheathed, and it leans against the step formed between the upper half and the lower half of the transparent outer case 6. In addition, three protrusions 12 (see FIG. 5) formed on the plastic main body 1 are right inserted into the three grooves 61 (see FIGS. 23 and 24) formed on the transparent outer case 6, and as long as the plastic main body 1 is rotated clockwise till its protrusions 12 go over the protrusions 62 disposed adjacent to the grooves 61 on the transparent outer case 6, the two will be firmly attached to each other so that the assembling of the small-sized food chopper is accomplished. The whole assembling process of the small-sized food chopper does not use any metal connection members.

Figure 18:
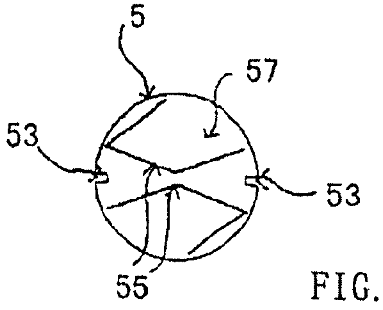
FIG. 18 depicts a bottom view of the blade connection holder shown in FIG. 16.
Figure 19:
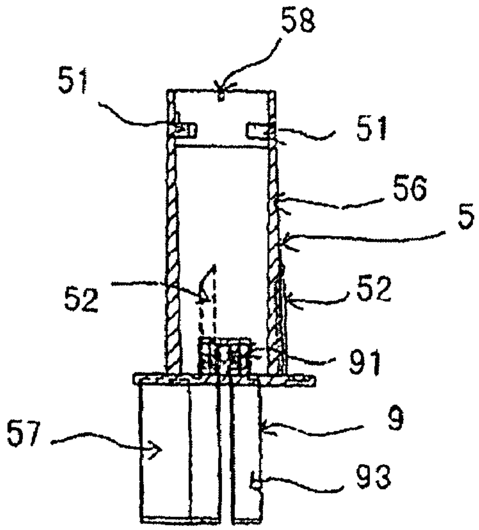
FIG. 19 depicts a section view along the line 19-19 shown in FIG. 16.
Figure 23:
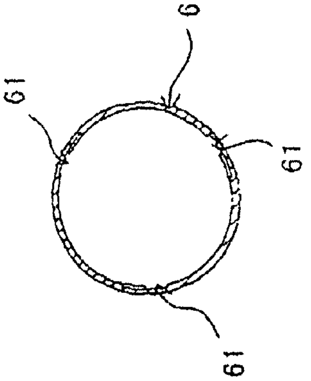
FIG. 23 depicts a top view of the transparent outer case shown in FIG. 3.
Figure 24:
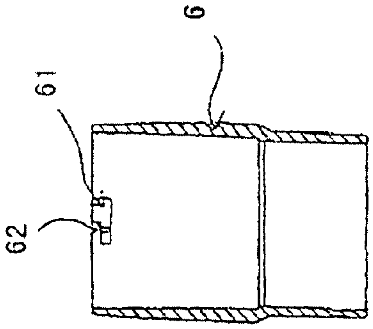
FIG. 24 depicts a section view of the transparent outer case shown in FIG. 23.

In the figures, FIGS. 4-6 show the plastic main body 1, FIGS. 7-9 show the top cover button 2, FIGS. 10-12 show the sleeve 4, FIGS. 13-15 show the crown-like support cap 7, FIGS. 17-19 show the combination of the blade connection holder 5 and the Z-shaped blades 9, FIGS. 20-22 show the blade inner cover 8 and FIGS. 23-24 show the transparent outer case 6.

Figure 25:
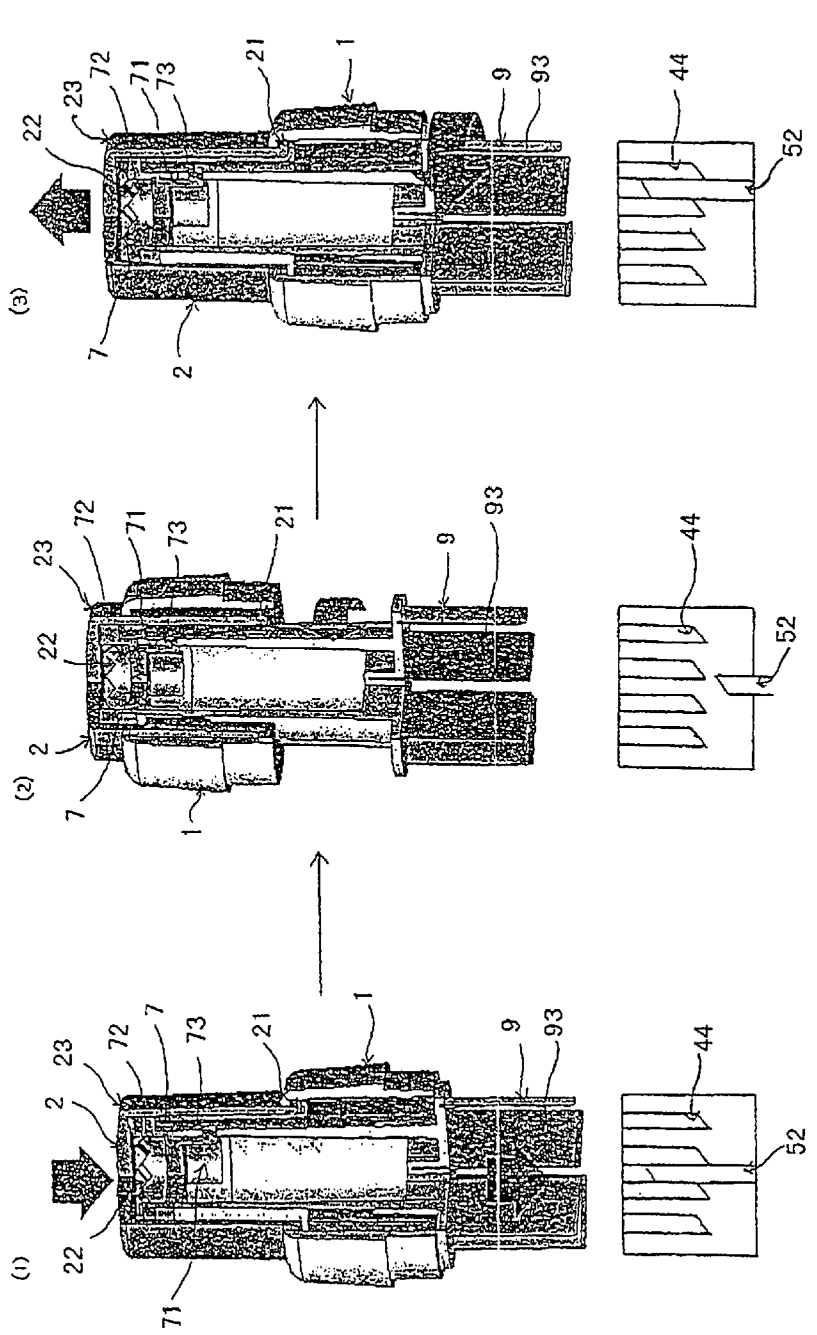
FIG. 25 depicts an operation diagram of the food chopper in the present invention.

Finally, please refer to FIG. 25, the figure is an operation diagram of the food chopper of the present invention, and the whole operation flow is shown in the order of (1) to (3), and each figure is a relationship diagram between the barrel body ribs 52 and the in-cap ribs 44 in this state.

FIG. 25(1) shows the state when the small-sized food chopper starts operation. During the operation, firstly, the top cover button 2 is pushed down, the cover bottom sprockets 22 of the top cover button 2 cling to the cap top sprocket 72 on the crown-like support cap 7 to drive the crown-like support cap 7, the blade connection holder 5 and the Z-shaped blades 9 to push down so that the Z-shaped blades 9 are pushed downward to cut the foodstuff. In this process, the barrel body ribs 52 slide vertically downward along the pit grooves between the in-cap ribs 44.

FIG. 25(2) shows the situation after the small-sized food chopper has accomplished the first cutting-down action, the cover bottom sprockets 22 of the top cover button 2 still cling to the cap top sprockets 72 on the crown-like support cap 7; meanwhile, the blade connection holder 5 has been completed pushed down to the position where the barrel body ribs 52 are separated completely from the in-cap ribs 44, here, the barrel body ribs 52 having bevel edges will slightly rotate clockwise, which makes the blade connection holder 5, the crown-like support cap 7 and the Z-shaped blades 9 slightly rotate clockwise along with it, and this is for preparing the blade connection holder 5 to make the next rotation when it returns to the original state while it is rising to collaborate with the other in-cap ribs 44 of the sleeve 4, whereas the Z-shaped blades 9 have passed through the two V-shaped slots 81 (see FIG. 22) in the stand base in the space within the blade inner cover 8 to get into the container 3.

FIG. 25(3) shows the small-sized food chopper when there is no additional force to push down the top cover button 2 again, the counterforce of the reset spring 10 lifts the crown-like support cap 7 high, whereas when the blade connection holder 5 rises, and when the barrel body ribs 52 having bevel edges touch the in-cap ribs 44 the next time, the slightly rotating barrel body ribs 52 will enter the adjacent in-cap ribs 44 so that the whole of the blade connection holder 5, the crown-like support cap 7 and the Z-shaped blade 9 together rotates one case clockwise, whereas when the blade connection holder 5 continues to rise, the cap top sprockets 72 cling to other adjacent cover bottom sprockets 22 so that the top cover button 2 is lifted up at the same time. When the actions shown in FIGS. 25(1) to 25(3) are accomplished, the small-sized food chopper has processed a cutting action and the Z-shaped blades 9 rotate a case, and different kinds of foodstuffs can be successfully chopped by merely repeating the aforesaid process.

The theory for making the blade connection holder 5, the crown-like support cap 7 and the Z-shaped blades 9 slightly rotate circumferentially is described below. In the state when the small-sized food chopper is assembled, the barrel body ribs 52 on the blade connection holder 5 are respectively engaged between two in-cap ribs 44 on the inner wall of the barrel body of the sleeve 4 so as to stop the rotation of the blade connection holder 5 with respect to the sleeve 4. In addition, in the state when the small-sized food chopper is assembled, the cap top sprockets 72 on the crown-like support cap 7 positioned with respect to the blade connection holder 5 are not right opposite the sprocket grooves between the cover bottom sprockets 22 of the top cover button 2, while they are properly staggered axially, as shown in FIG. 2 and FIG. 25(1). Therefore, in the initial phase of the operation of the small-sized food chopper, before the barrel body ribs 52 on the blade connection holder 5 separate axially from the in-cap ribs 44 on the inner wall of the barrel body of the sleeve 4, although force is applied circumferentially by the cover bottom sprockets 22 of the top cover button 2 to the cap top sprockets 72 on the crown-like support cap 7, the blade connection holder 5 cannot rotate with respect to the sleeve 4 so that the crown-like support cap 7 cannot rotate with respect to the top cover button 2; whereas when the barrel body ribs 52 on the blade connection holder 5 are axially separated from the in-cap ribs 44 on the inner wall of the barrel body of the sleeve 4, the restriction stopping the rotation of the blade connection holder 5 is released, and thus the blade connection holder 5 and the crown-like support cap 7 which are fixed to each other can slightly rotate with respect to the sleeve 4.

It can be seen from the aforesaid structure that since the present invention provides a brand-new design, all the parts of the food chopper of the present invention are made of plastic except the Z-shaped blades 9 which are made of stainless metal; in addition, the whole inlaying process of the present invention does not involve any metal made connection members. Thus, the present food chopper not only has an exterior pleasing to the eye, and is smaller in volume than any existing chopper, but it further resolves the problem of cleansing the food chopper conveniently, that is, it allows the user to disassemble the whole food chopper and cleanse it thoroughly. Further, this design of the small-sized food chopper has absolutely greatly reduced the occurrence of the food contamination problem due to the rust of some of the parts after long use. Furthermore, the design of the hidden inner reset spring 10 makes the reset spring 10 more difficult to be damaged, and makes the food chopper more durable; the most important point is that the parts in charge of rotation (the barrel body ribs 52 on the blade connection holder 5 and the in-cap ribs 44 of the sleeve 4, respectively) and the parts in charge of the pushing-down action (the top cover button 2, the blade connection holder 5, the crown-like support cap 7 and the Z-shaped blades 9, respectively) in this design are operated at different positions of the composite parts, and thus when the handle is pushed down and just begins to rise, the handle will never be stuck and thus can successfully accomplish the whole chopping-up process.

While the preferred embodiments of the invention have been described with combination of the figures, it should be understood by those skilled in the art that the embodiments are not so limited and modifications may be made without departing from the spirit and the scope of the present invention. For instance, the setting of the sleeve 4 may be omitted, and the in-cap ribs 44 can be directly disposed on the inner wall of the plastic main body 1; the blades 9 may not be Z-shaped and other types of blades may be adopted; the means which makes the blade connection holder rotate circumferentially a predetermined angle each time the blade connection holder is operated axially can be replaced with other structure familiar to those skilled in the art.

What is claimed is:

1. A small-sized food chopper for chopping up foodstuffs, comprising:

an outer case including a lower casing removably connected with an upper casing and a button mounted on the upper casing;

a blade connection holder installed inside said outer case, wherein said blade connection holder can move axially up and down in the outer case;

a plurality of blades installed on a lower end of the blade connection holder;

a reset spring sheathed on the blade connection holder which restores the blade connection holder axially up;

means for rotating the blade connection holder for a predetermined angle circumferentially each time the blade connection holder operates axially once;

a cup-shaped blade inner cover installed inside the lower casing and axially fixed with respect to the lower casing, and a slot being formed at a bottom of the cup-shaped blade inner cover which has a shape corresponding to that of the blades so as to allow the blades to move axially through the slot, wherein the blade inner cover can rotate circumferentially along with the blade connection holder, and when the small-sized food chopper is in a non-operation state, the blades are located in the cup-shaped blade inner cover;

wherein said button is configured such that it can slide up and down axially, and said button acts on an upper end of the blade connection holder to move the blade connection holder axially downwardly.

2. The small-sized food chopper of claim 1, characterized in that axially extending projection columns or grooves are formed on an inner wall of the blade inner cover, and corresponding grooves or projection columns are formed on the blade connection holder to engage with the projection columns or the grooves formed on the inner wall of the blade inner cover.

3. The small-sized food chopper of claim 2, characterized in that the blade connection holder has a cylindrical barrel body and a disc-shaped stand base, the blades are fixed on the stand base, the grooves or projection columns are formed on the stand base, while projections are formed on a top portion of the inner wall of the blade inner cover and they abut against the stand base of the blade connection holder and countercheck axial movement of the blade connection holder.

4. The small-sized food chopper of claim 3, further comprising a sleeve removably installed in the upper casing, wherein the barrel body of the blade connection holder is inserted in the sleeve, a plurality of barrel body ribs axially extending from the disc-shaped stand base upward are disposed on an outer wall of the barrel body of the blade connection holder, while a plurality of in-cap ribs extending axially upwardly are disposed on an inner wall of the sleeve, when the small-sized food chopper is in a non-operation state, each of the plurality of barrel body ribs is engaged between a pair of the in-cap ribs to limit circumferential rotation of the blade connection holder, whereas when the small-sized food chopper is in the operation state, the plurality of barrel body ribs can get disengaged axially from the in-cap ribs, wherein inclined planes in the same slanting direction are formed on upper ends of the barrel body ribs and on lower ends of the in-cap ribs for urging the barrel body ribs to be inserted between the in-cap ribs.

5. The small-sized food chopper of claim 4, characterized in that a plurality of notches are disposed at a predetermined circumferential space on the upper casing, the sleeve has a barrel body and a flange disposed at a lower end of the barrel body; a plurality of cap legs circumferentially spaced and extending upwardly are disposed on the flange, a clip hook is formed at a top end of each of the cap legs, and the sleeve is removably fixed on the upper casing by clipping the clip hooks of the cap legs on the sleeve into the notches on the upper casing.

6. The small-sized food chopper of claim 1, characterized in that a plurality pairs of axially extending projection column tracks are disposed at a predetermined circumferential space on an inner wall of the upper casing, each pair of the projection column tracks defining a guiding groove track a plurality of arc-shaped projections extending radially outwardly are formed a lower end of the button, and the arc-shaped projections are engaged with the guiding groove tracks defined by the plurality pairs of the projection column tracks.

7. The small-sized food chopper of claim 1, further comprising a food container disposed at its bottom.

8. The small-sized food chopper of claim 1, characterized in that the blades are Z-shaped blades.

9. A small-sized food chopper for chopping up foodstuffs comprising:

an outer case including a lower casing removably connected with an upper casing and a button mounted on the upper casing:

a blade connection holder installed inside said outer case, wherein said blade connection holder can move axially up and down in the outer case;

a plurality of blades installed on a lower end of the blade connection holder;

a reset spring sheathed on the blade connection holder which restores the blade connection holder axially up;

means for rotating the blade connection holder for a predetermined angle circumferentially each time the blade connection holder operates axially once;

wherein said button is configured such that it can slide up and down axially, and said button acts on an upper end of the blade connection holder to move the blade connection holder axially downwardly;

wherein a circular support cap is installed on the upper end of the blade connection holder, a plurality of sprockets are formed by left and right bevel edges on a top surface of the circular support cap, while the button is cylindrical in shape with its top closed, a plurality of sprockets are formed by left and right bevel edges on an inner top wall of the button for engaging with the sprockets on the top surface of the circular support cap.

10. A small-sized food chopper for chopping up foodstuffs comprising:

an outer case including a lower casing removably connected with an upper casing and a button mounted on the upper casing:

a blade connection holder installed inside said outer case, wherein said blade connection holder can move axially up and down in the outer case;

a plurality of blades installed on a lower end of the blade connection holder;

a reset spring sheathed on the blade connection holder which restores the blade connection holder axially up;

means for rotating the blade connection holder for a predetermined angle circumferentially each time the blade connection holder operates axially once;

wherein said button is configured such that it can slide up and down axially, and said button acts on an upper end of the blade connection holder to move the blade connection holder axially downwardly;

wherein the upper casing comprises an upper portion having a bigger diameter and a lower portion having a smaller diameter, and thus a step is formed therebetween, a plurality of circumferentially spaced projections are disposed on an outer wall of the lower portion a plurality of circumferentially spaced grooves are formed on an inner wall of the lower casing, and projections are disposed on the inner wall of the lower casing adjacent to the grooves, and the upper casing and the lower casing are removably fixed to each other by inserting the lower portion of the upper casing into the lower casing and engaging the projections of the lower portion with the grooves of the lower casing, and then by relatively rotating the upper casing and the lower casing and making the projections of the upper casing go over the projections of the lower casing.

11. The small-sized food chopper of claim 9, characterized in that a plurality of cap legs axially extending downwardly are formed on the circular support cap, clip hooks are formed at lower ends of the cap legs, and a locating groove column is formed on the circular support cap; while a plurality of corresponding grooves are formed on an inner wall of a barrel body of the blade connection holder and a locating groove is formed on the barrel body of the blade connection holder; the circular support cap is removably fixed on the blade connection holder by clipping the clip hooks of the cap legs on the circular support cap into the corresponding grooves on the inner wall of the barrel body of the blade connection holder, while the circular support cap is circumferentially located with respect to the blade connection holder by inserting the locating groove column on the circular support cap into the locating groove on the barrel body of the blade connection holder.

* * * * *